US011907522B2

(12) United States Patent
Rajesh et al.

(10) Patent No.: US 11,907,522 B2
(45) Date of Patent: Feb. 20, 2024

(54) SYSTEM FOR DYNAMIC ALLOCATION OF NAVIGATION TOOLS BASED ON LEARNED USER INTERACTION

(71) Applicant: Bank of America Corporation, Charlotte, NC (US)

(72) Inventors: Madhumathi Rajesh, Chennai (IN); Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 304 days.

(21) Appl. No.: 16/910,843

(22) Filed: Jun. 24, 2020

(65) Prior Publication Data

US 2021/0406759 A1 Dec. 30, 2021

(51) Int. Cl.
| | |
|---|---|
| *G06F 3/0484* | (2022.01) |
| *G06F 3/0487* | (2013.01) |
| *G06N 20/00* | (2019.01) |
| *G06F 3/04847* | (2022.01) |
| *G01C 21/20* | (2006.01) |
| *G06F 18/24* | (2023.01) |
| *G06F 18/214* | (2023.01) |

(52) U.S. Cl.
CPC ........... *G06F 3/0487* (2013.01); *G01C 21/20* (2013.01); *G06F 3/04847* (2013.01); *G06F 18/214* (2023.01); *G06F 18/24* (2023.01); *G06N 20/00* (2019.01)

(58) Field of Classification Search
CPC .... G06N 20/00; G06K 9/6267; G06K 9/6256; G06F 3/04847; G01C 21/20
See application file for complete search history.

(56) References Cited

U.S. PATENT DOCUMENTS

| | | | |
|---|---|---|---|
| 8,315,791 B2 | 11/2012 | Bales et al. | |
| 8,493,407 B2 | 7/2013 | Arrasvuori | |
| 8,682,576 B2 | 3/2014 | Kurtti et al. | |
| 8,760,426 B1 * | 6/2014 | Strand | G06F 1/1686 345/169 |
| 9,200,910 B2 | 12/2015 | Fowe | |
| 9,360,333 B2 | 6/2016 | Tuukkanen et al. | |
| 9,404,753 B2 | 8/2016 | Mays et al. | |
| 9,423,937 B2 * | 8/2016 | Penilla | G06F 3/0484 |
| 9,426,769 B2 | 8/2016 | Haro | |

(Continued)

*Primary Examiner* — Anil K Bhargava
(74) *Attorney, Agent, or Firm* — Moore & Van Allen PLLC; Anup Shrinivasan Iyer

(57) ABSTRACT

Systems, computer program products, and methods are described herein for dynamic allocation of navigation tools based on learned user interaction. The present invention is configured to generate a training dataset based on at least the information associated with the interaction of the user with the one or more GUI grids, information associated with the one or more interactions of the one or more peers with the one or more GUI grids, information associated with the user, and information associated with the one or more peers; initiate one or more machine learning algorithms on the training dataset; receive, via the user computing device, a user selection of an unseen navigation tool for placement on the GUI; and classify the unseen navigation tool using the first set of parameters to predict a placement of the unseen navigation tool in at least one of one or more GUI grids associated with the GUI.

13 Claims, 3 Drawing Sheets

(56) References Cited

U.S. PATENT DOCUMENTS

| | | | |
|---|---|---|---|
| 9,678,660 | B2 | 6/2017 | Beaurepaire et al. |
| 9,710,714 | B2 | 7/2017 | Chen et al. |
| 9,728,084 | B2 | 8/2017 | Stenneth |
| 9,736,650 | B2 | 8/2017 | Beaurepaire et al. |
| 9,904,286 | B2 | 2/2018 | Kozak |
| 9,909,875 | B2 | 3/2018 | Holm et al. |
| 9,978,274 | B2 | 5/2018 | Dannenbring |
| 9,992,627 | B2 | 6/2018 | Letz et al. |
| 10,030,988 | B2 | 7/2018 | Brush et al. |
| 10,148,709 | B2 | 12/2018 | Boldyrev et al. |
| 10,168,698 | B2 | 1/2019 | Tillmann |
| 10,359,290 | B2 | 7/2019 | Felix et al. |
| 10,402,995 | B2 | 9/2019 | Kwant et al. |
| 10,598,489 | B2 | 3/2020 | Zhang et al. |
| 10,670,416 | B2 | 6/2020 | Wheeler et al. |
| 10,761,799 | B2 * | 9/2020 | Disano .................. G06F 1/162 |
| 11,138,518 | B1 * | 10/2021 | Yu ...................... G06F 9/44526 |
| 2014/0282269 | A1 * | 9/2014 | Strutt ................ G06F 3/04886 715/863 |
| 2018/0275866 | A1 * | 9/2018 | Chanyontpatanakul .................... G06F 3/04883 |
| 2019/0075187 | A1 * | 3/2019 | Chokhawala .......... G06N 20/00 |
| 2020/0133641 | A1 * | 4/2020 | Sinn ...................... G06N 20/20 |
| 2021/0150624 | A1 * | 5/2021 | Tucker ................ G06Q 20/405 |
| 2021/0191612 | A1 * | 6/2021 | Karunamuni ............. G06F 9/44 |
| 2021/0294582 | A1 * | 9/2021 | Accardo .................. G06N 3/08 |

* cited by examiner

SYSTEM FOR DYNAMIC ALLOCATION OF NAVIGATION TOOLS BASED ON LEARNED USER INTERACTION

FIELD OF THE INVENTION

The present invention embraces a system for dynamic allocation of navigation tools based on learned user interaction.

BACKGROUND

Graphical User Interface (GUI) Design focuses on anticipating what users might need to do and ensuring that the interface has navigation tools that are easy to access, understand, and use to facilitate those actions. GUI brings together concepts from interaction design, visual design, and information architecture. However, the effectiveness of the GUI design to each user is highly subjective.

There is a need for a system for dynamic allocation of navigation tools based on learned user interaction.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic allocation of navigation tools based on learned user interaction is presented. The system comprising: at least one non-transitory storage device; and at least one processing device coupled to the at least one non-transitory storage device, wherein the at least one processing device is configured to: electronically receive information associated with an interaction of a user with one or more graphical user interface (GUI) grids associated with a graphical user interface (GUI) displayed on a user computing device; electronically receive information associated with the user; electronically receive information associated with one or more interactions of one or more peers with the one or more GUI grids associated with the GUI displayed on one or more peer computing devices; generate a training dataset based on at least the information associated with the interaction of the user with the one or more GUI grids, the information associated with the one or more interactions of the one or more peers with the one or more GUI grids, and the information associated with the user; initiate one or more machine learning algorithms on the training dataset, wherein initiating further comprises generating a first set of parameters; electronically receive, via the user computing device, a user selection of an unseen navigation tool for placement on the GUI; classify the unseen navigation tool using the first set of parameters, wherein classifying further comprises predicting a placement of the unseen navigation tool in at least one of one or more GUI grids associated with the GUI; and transmit control signals configured to execute the placement of the unseen navigation tool in the at least one of the one or more GUI grids associated with the GUI based on at least the classification.

In some embodiments, the at least one processing device is further configured to: electronically receive information associated with the user, wherein the information associated with the user comprises at least a historical placement of one or more navigation tools on the GUI by the user on the user computing device; and electronically receive information associated with the one or more peers, wherein the information associated with the one or more peers comprises at least a historical placement of the one or more navigation tools on the GUI by the one or more peers on the one or more peer computing devices.

In some embodiments, the at least one processing device is further configured to generate the information associated with the interaction of the user with the one or more GUI grids, wherein generating further comprises: segmenting the GUI into the one or more GUI grids, wherein the one or more GUI grids comprises at least one of the one or more navigation tools positioned therein; monitoring the interaction of the user with the one or more navigation tools displayed on the GUI for a predetermined period of time; and determining the one or more GUI grids corresponding to the interaction of the user with the one or more navigation tools.

In some embodiments, the at least one processing device is further configured to generate the information associated with the interaction of the user with the one or more GUI grids, wherein generating further comprises capturing one or more gestures executed by the user, wherein the one or more gestures comprises at least tap, press, two-finger tap, press-tap, press-and-hold, one-finger pan, two-finger pan, pinch, rotate, flick, drag-and-drop, slide to scroll, slide-and-hold, and/or the like.

In some embodiments, the at least one processing device is further configured to generate the information associated with the interaction of the user with the one or more GUI grids, wherein generating further comprises capturing sequential interactions of the user with the one or more GUI grids.

In some embodiments, the at least one processing device is further configured to: electronically receive, via the user computing device, an access request from the user to access an application stored on the user computing device, wherein the application is associated with the GUI; electronically transmit, an authentication request to the user, wherein the authentication request comprises at least a request for one or more authentication credentials from the user; electronically receive the one or more authentication credentials from the user; validate the user based on at least verifying the one or more authentication credentials; and approve the access request to the GUI based on at least validating the user.

In some embodiments, the at least one processing device is further configured to: initiate a presentation of a navigation tool interface on the user computing device in response to approving the access request, wherein the navigation tool interface comprises all available navigation tools associated with the application; electronically receive, via the navigation tool interface, a user input selecting the one or more navigation tools from all the available navigation tools associated with the application; populate the GUI with the one or more navigation tools based on at least receiving the user input.

In some embodiments, the at least one processing device is further configured to: electronically receive, via the navigation tool interface, a user input selecting the one or more navigation tools, wherein the user input comprises at least the unseen navigation tool; and transmit control signals configured to execute the placement of the unseen navigation tool in the at least one of the one or more GUI grids based on at least the classification.

In another aspect, a computer program product for dynamic allocation of navigation tools based on learned user interaction, the computer program product comprising a non-transitory computer-readable medium comprising code causing a first apparatus to: electronically receive information associated with an interaction of a user with one or more graphical user interface (GUI) grids associated with a graphical user interface (GUI) displayed on a user computing device; electronically receive information associated with the user; electronically receive information associated with one or more interactions of one or more peers with the one or more GUI grids associated with the GUI displayed on one or more peer computing devices; generate a training dataset based on at least the information associated with the interaction of the user with the one or more GUI grids, the information associated with the one or more interactions of the one or more peers with the one or more GUI grids, and the information associated with the user; initiate one or more machine learning algorithms on the training dataset, wherein initiating further comprises generating a first set of parameters; electronically receive, via the user computing device, a user selection of an unseen navigation tool for placement on the GUI; classify the unseen navigation tool using the first set of parameters, wherein classifying further comprises predicting a placement of the unseen navigation tool in at least one of one or more GUI grids associated with the GUI; and transmit control signals configured to execute the placement of the unseen navigation tool in the at least one of the one or more GUI grids associated with the GUI based on at least the classification.

In yet another aspect, a method dynamic allocation of navigation tools based on learned user interaction is presented. The method comprising: electronically receiving information associated with an interaction of a user with one or more graphical user interface (GUI) grids associated with a graphical user interface (GUI) displayed on a user computing device; electronically receiving information associated with the user; electronically receiving information associated with one or more interactions of one or more peers with the one or more GUI grids associated with the GUI displayed on one or more peer computing devices; generating a training dataset based on at least the information associated with the interaction of the user with the one or more GUI grids, the information associated with the one or more interactions of the one or more peers with the one or more GUI grids, and the information associated with the user; initiating one or more machine learning algorithms on the training dataset, wherein initiating further comprises generating a first set of parameters; electronically receiving, via the user computing device, a user selection of an unseen navigation tool for placement on the GUI; classifying the unseen navigation tool using the first set of parameters, wherein classifying further comprises predicting a placement of the unseen navigation tool in at least one of one or more GUI grids associated with the GUI; and transmitting control signals configured to execute the placement of the unseen navigation tool in the at least one of the one or more GUI grids associated with the GUI based on at least the classification.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
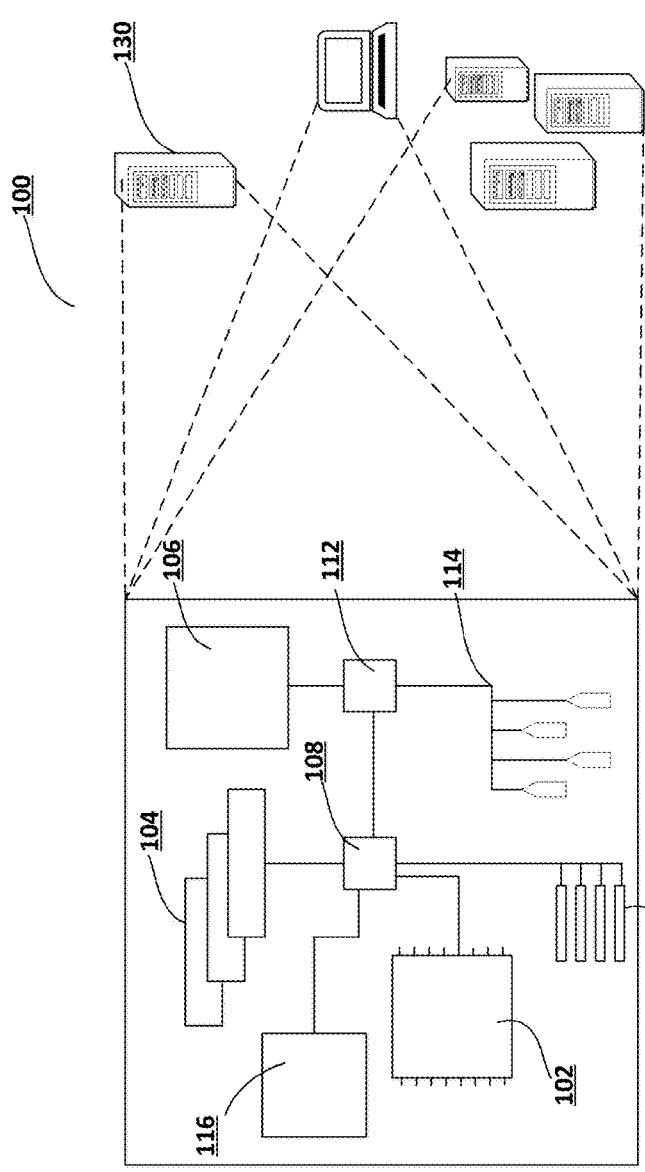
Figure 1:
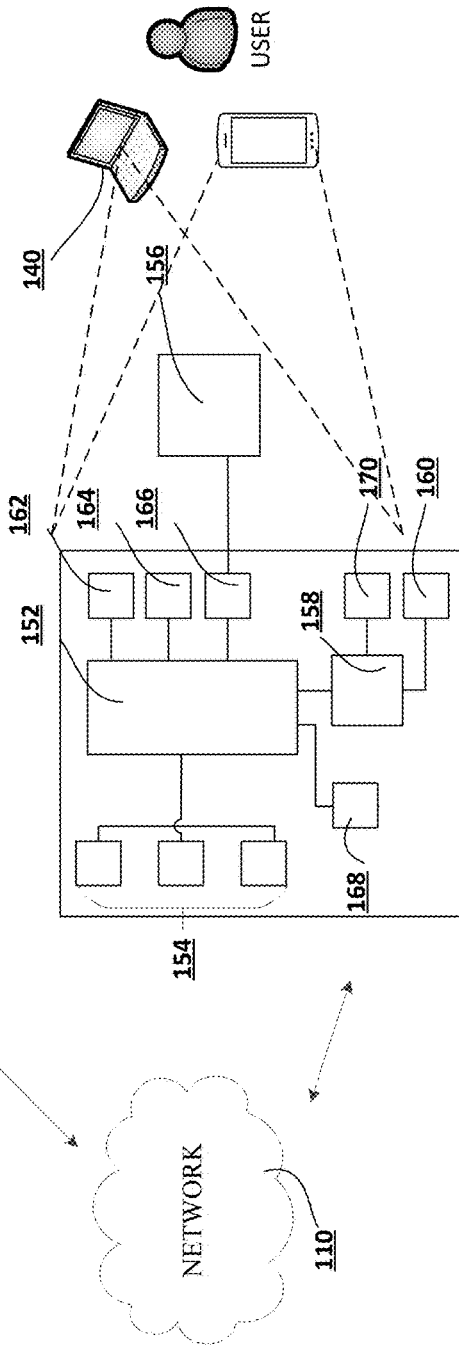
Figure 2:
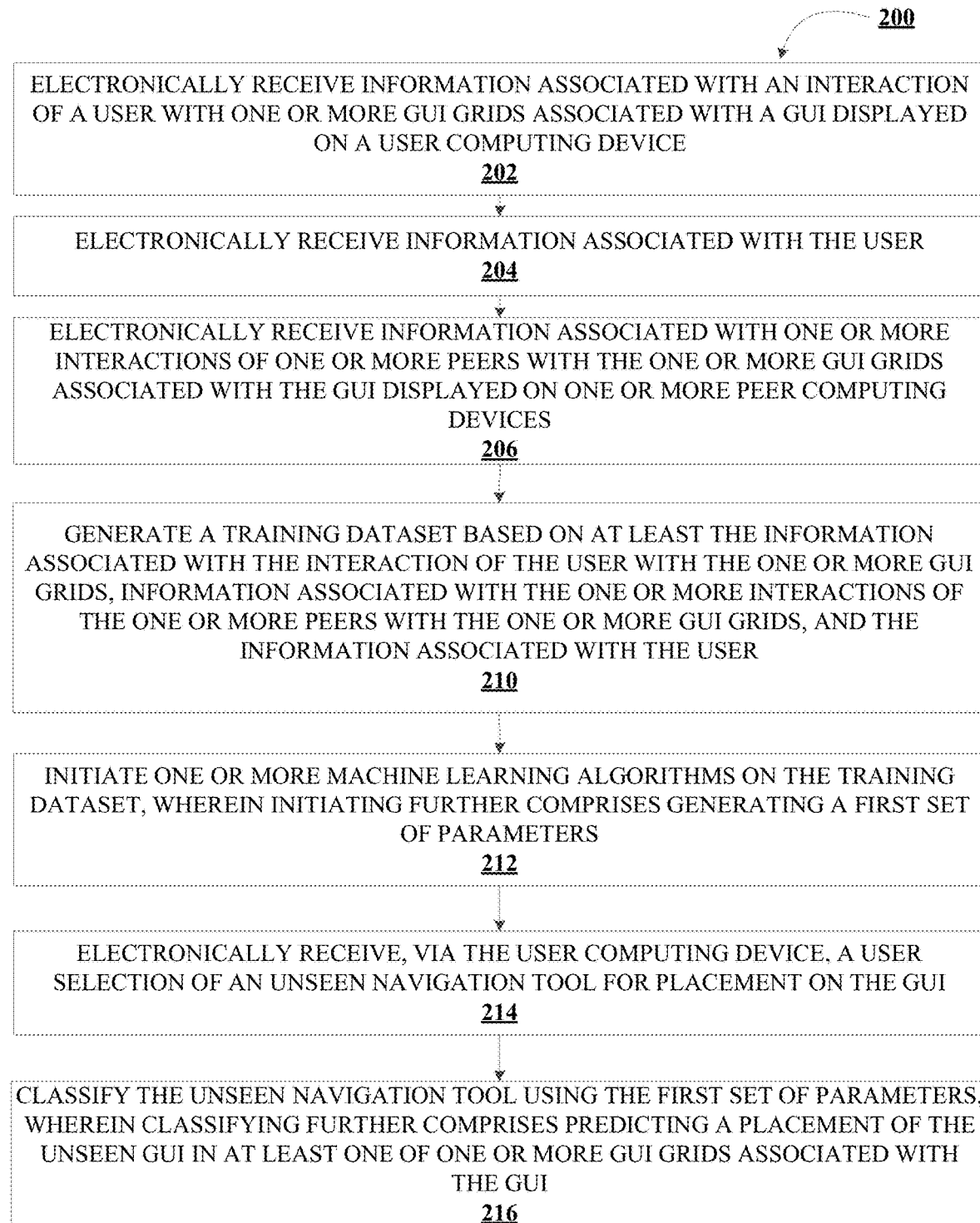
Figure 3:
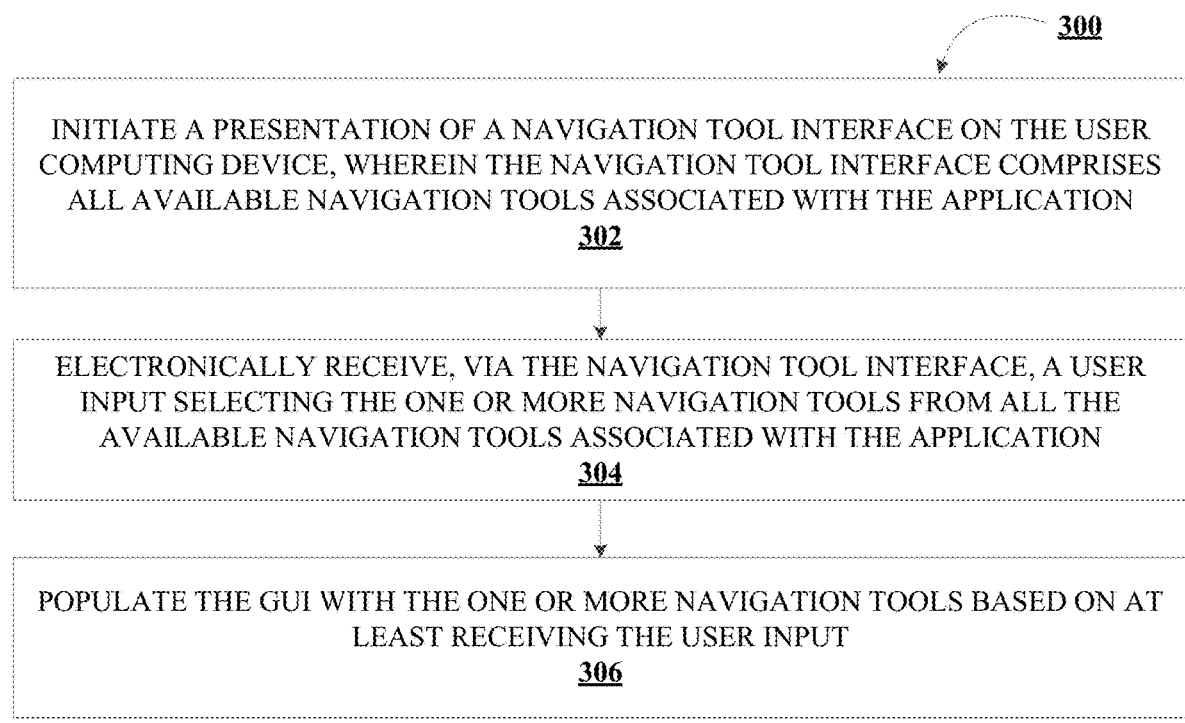

Having thus described embodiments of the invention in general terms, reference will now be made the accompanying drawings, wherein:

FIG. 1 illustrates technical components of a system for dynamic allocation of navigation tools based on learned user interaction, in accordance with an embodiment of the invention;

FIG. 2 illustrates a process flow for classifying an unseen navigation tool selected by the user for allocation on the graphical user interface (GUI), in accordance with an embodiment of the invention; and FIG. 3 illustrates a process flow for dynamic allocation of navigation tools, in accordance with an embodiment of the invention, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like. In some other embodiments, an interaction may refer to human-computer interaction—a space where interactions between the user and a device occurs. Such interactions allow for effective operation and control of the device from the user-end, while the device simultaneously feeds back information that aids the user's decision-making process.

FIG. 1 presents an exemplary block diagram of the system environment for dynamic allocation of navigation tools based on learned user interaction 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for classifying an unseen navigation tool selected by the user for allocation on the graphical user interface (GUI), in accordance with an embodiment of the invention. As shown in block 202, the process flow includes electronically receiving information associated with an interaction of a user with one or more graphical user interface (GUI) grids associated with a GUI displayed on a user computing device. In some embodiments, the information associated with the interaction of the user may be generated by segmenting the GUI into one or more grids. In one aspect, the one or more grids may be formed by a series of intersecting lines (vertical and/or horizontal) dividing the GUI. Each grid thus formed may be configured to house one or more navigation tools.

In one aspect, a navigation tool may be an interface element, such as pictogram or ideogram, displayed on the GUI to help the user navigate the user computing device. For example, the one or more navigation tools may include a graphical icon that is a symbol of a software tool, function, or a data file, accessible on the user computing device capable of serving as an electronic hyperlink or file shortcut to access the program or data. In response to segmenting the GUI into one or more grids, the system may be configured to monitor the interaction of the user with the one or more navigation tools displayed on the GUI for a predetermined period of time. In some embodiments, the one or more navigation tools may be one or more stand-alone mobile applications. In some other embodiments, the one or more navigation tools may be associated with a mobile application. In this regard, when a user initiates a mobile application, the GUI presented to the user may include one or more navigation tools to access one or more functions and/or services provided to the user via the mobile application. For example, in cases where the mobile application is a financial institution application, the navigation tools may include bill pay, deposit, transfer, account access, and/or the like.

In response to monitoring the interaction of the user with the one or more navigation tools, the system may be configured to determine the one or more GUI grids corresponding to the interaction of the user with the one or more navigation tools. In some embodiments, based on the order in which the user accesses the one or more navigation tools, the system may be configured to identify a sequence of grids accessed by the user. In examples where the navigation tools associated with the financial institution application, the user may initiate the financial institution application and interact with the account access (located in Grid B) followed by the bill pay navigation tool (located in Grid A) and then the transfer navigation tool (located in Grid C). In such cases, the sequence of grids, B-A-C, may be recorded as part of the information associated with the interaction of the user with the one or more GUI grids. In examples where the navigation tools are one or more stand-alone mobile applications, the user may unlock the GUI and access the personal information manager application (located in Grid D) followed by the social media application (located in Grid F) and then the browser application (located in Grid E). In such cases, the sequence of grids, D-F-E, may be recorded as part of the information associated with the interaction of the user with the one or more GUI grids.

In some embodiments, the information associated with the interaction of the user with the one or more GUI grids may include capturing one or more gestures executed by the user. In one aspect, the one or more gestures may include, but is not limited to, tap, press, two-finger tap, press-tap, press-and-hold, one-finger pan, two-finger pan, pinch, rotate, flick, drag-and-drop, slide to scroll, slide-and-hold, shake, and/or the like.

As shown in block 204, the process flow includes electronically receiving information associated with the user. In some embodiments, the information associated with the user may include a handedness of the user interacting with the GUI grids. In this regard, the system may be configured determine how the user is interacting with the user computing device. For example, if the user computing device is a mobile device, the user is interacting with the navigation tools without a mouse and/or keyboard. It is likely that the user is holding the phone with the fingers cradling the back of the mobile device and the thumbs doing all the work. In some cases, the user may be holding the mobile device with one hand and poking at it with the other. When using a mobile device one-handed, users generally favor one side of the screen over the other. A right-handed person will likely favor the right ride of the GUI while the left-handed person will likely favor the left side of the GUI. In addition, the system may be configured to identify the movement of the finger interacting with the GUI. Each finger can extend in length and tap-point but also has a natural arc of movement.

In some other embodiments, the information associated with the user may include the historical placement of the navigation tools on the GUI by the user. In this regard, the system may be configured to electronically receive information associated with the historical placement of the one or more navigation tools on the GUI by the user on the user computing device. For example, the user may place a frequently used navigation tool on a grid that is most easily and often accessible for the user. For a right-handed user who prefers to interact with the GUI presented on the mobile device using his/her thumbs, the user may place the account access navigation tool (most frequently used) on the farthest grid column on the right of the GUI, and a bill pay (least frequently used) on the farthest grid column on the left of the GUI.

As shown in block 206, the process flow includes electronically receiving information associated with one or more interactions of one or more peers with the one or more GUI grids associated with the GUI displayed on the one or more peer computing devices. In some embodiments, the one or more peers may be one or more other users with same or similar characteristics as the user. In some embodiments, the system may be configured to identify the peers based on at least receiving information associated with the one or more peers. In some embodiments, the information associated with the one or more peers may be same or similar to the information associated with the users described herein. For example, if the user is determined to be a right-hand mobile device user, the peers identified for the user will be other users who are also right-handed mobile device users. In response to receiving the information associated with the one or more peers, the system may be configured to receive information associated with the one or more interactions of the one or more peers with the one or more GUI grids associated with the GUI displayed on the one or more peer computing devices. In one aspect, the information associated with the one or more interactions of the one or more peers with the one or more GUI grids may be similar to the information associated with the one or more interactions of the users with the one or more GUI grids. For example, the information associated with the one or more peers may include at least a historical placement of the one or more navigation tools on the GUI by the one or more peers on the one or more peer computing devices.

In some embodiments, the information associated with the interaction of the user with the one or more GUI grids, information associated with the one or more interactions of the one or more peers with the one or more GUI grids, information associated with the user, and information associated with the one or more peers are individual measurable property or characteristic identifying how the navigation tools are being placed on the GUI and how the GUI is being used in general. Thus, these properties may be used as features in training the machine learning algorithm, as described in further detail below. In some embodiments, these features may be transformed into one or more multi-dimensional vectors in a multi-dimensional state space. In this regard, the system may be configured to initiate a vectorization engine on the features. Representing the features as vectors (numerical values) facilitates meaningful analytics to be performed and also creates the instances on which machine learning algorithms operate. Each property of the multi-dimensional vector representation may be a feature.

As shown in block 208, the process flow includes generating a training dataset based on at least the information associated with the interaction of the user with the one or more GUI grids, information associated with the one or more interactions of the one or more peers with the one or more GUI grids, information associated with the user, and information associated with the one or more peers. In some embodiments, prior to training the machine learning model with these features, they have to be normalized. In this regard, the system may be configured to initiate a feature normalization algorithm on the one or more features. In response, In response, the system may be configured to normalize, using the feature normalization algorithm, the one or more features extracted to generate one or more normalized features. In one aspect, normalizing the features may rescale the features extracted to ensure that the features fit under the same probability distribution. In some embodiments, this may involve centering the features around zero mean with a predefined standard deviation.

As shown in block 210, the process flow includes initiating one or more machine learning algorithms on the training dataset, wherein initiating further comprises generating a first set of parameters. In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. In some embodiments, the one or more machine learning algorithms may include convolutional neural networks (CNNs). By implementing CNNs, either singly or in combination with any of the other machine learning algorithms, the interactions of the user can be represented in the form of images and using CNNs, a visual flow of the interaction can be created. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

In some embodiments, the process of implementing machine learning algorithms on the training dataset to generate the first set of parameters may be referred to as training the machine learning model. Typically, the training process is iterative, meaning that it progresses step by step with small updates to the set of parameters in each iteration and, in turn, a change in the performance of the model at each iteration. In some embodiments, the first set of parameters may be generated by solving the optimization problem that finds for parameters that result in minimum error or loss.

As shown in block 212, the process flow includes electronically receiving, via the user computing device, a user selection of an unseen navigation tool for placement on the GUI. In some embodiments, the unseen navigation tool may be any navigation tool that has not been previously positioned on the GUI. In some other embodiments, the unseen navigation tool may be any navigation tool that has been previously positioned on the GUI, but is not currently positioned on the GUI.

As shown in block 214, the process flow includes classifying the unseen navigation tool using the first set of parameters, wherein classifying further comprises predicting a placement of the unseen GUI in at least one of the one or more GUI grids associated with the GUI. In some embodiments, the classification of the unseen navigation tool may be structured as a multi-class classification. Multiclass classification is a classification task that consists of more than two classes. Here, each of the one or more grids in the GUI can be labeled as a particular class. In analyzing the training dataset, the machine learning model learns patterns specific to each class and uses those patterns to predict the membership of unseen data (unseen navigation tool).

FIG. 3 illustrates a process flow for dynamic allocation of navigation tools based on learned user interaction, in accordance with an embodiment of the invention, in accordance with an embodiment of the invention. As shown in block 302, the process flow includes initiating a presentation of a navigation tool interface on the user computing device, wherein the navigation tool interface comprises all available navigation tools associated with the application. In some embodiments, the system may be configured to electronically receive, via the user computing device, an access request from the user to access an application (e.g., financial institution application) stored on the user computing device. In one aspect, the application that the user is attempting to access is associated with the GUI, where on approval, the system may be configured to display the GUI on the user computing device. In response, the system may be configured to electronically transmit, an authentication request to the user. In some embodiments, the authentication request may include at least a request for one or more authentication credentials from the user. In response to the authentication request, the system may be configured to receive the one or more authentication credentials from the user. Having received the one or more authentication credentials, the system may be configured to validate the user based on at least verifying the one or more authentication credentials. In response to validating the user, the system may be configured to approve the access request to the GUI.

Next, as shown in block 304, the process flow includes electronically receiving, via the navigation tool interface, a user input selecting the one or more navigation tools from all the available navigation tools associated with the application. In some embodiments, the user input may include a selection of the unseen navigation tool.

Next, as shown in block 306, the process flow includes populating the GUI with the one or more navigation tools based on at least receiving the user input. In embodiments where the user has selected the unseen navigation tool, the system may be configured to execute the placement of the unseen navigation tool in the at least one of the one or more GUI grids based on at least the classification.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic allocation of navigation tools based on learned user interaction, the system comprising:
    at least one non-transitory storage device; and
    at least one processing device coupled to the at least one non-transitory storage device, wherein the at least one processing device is configured to:
    segment a graphical user interface (GUI) into one or more GUI grids, wherein the one or more GUI grids comprises one or more navigation tools positioned therein;
    receive information associated with an interaction of a user with the one or more GUI grids associated with a graphical user interface (GUI) displayed on a user computing device, wherein receiving further comprises:
    monitoring the interaction of the user with the one or more navigation tools for a predetermined period of time;
    determining one or more sequences of GUI grid interactions performed by the user when interacting with the one or more navigation tools; and
    capturing one or more gestures executed by the user on each GUI grid during each sequence of GUI grid interactions, wherein the one or more gestures comprises tap, press, two-finger tap, press-tap, press-and-hold, one-finger pan, two-finger pan, pinch, rotate, flick, drag-and-drop, slide to scroll, slide-and-hold, and shake;
    receive information associated with the user, wherein the information associated with the user comprises a handedness of the user, an interaction technique of the user when interacting with the one or more GUI grids based on at least the handedness, and a favored side of the GUI based on at least the interaction technique;
    receive information associated with one or more interactions of one or more peers with the one or more GUI grids associated with the GUI displayed on one or more peer computing devices, wherein the one or more peers are associated with a handedness that is same as the handedness of the user;
    generate a training dataset based on at least the information associated with the interaction of the user with the one or more GUI grids, the information associated with the one or more interactions of the one or more peers with the one or more GUI grids, and the information associated with the user;
    initiate one or more machine learning algorithms on the training dataset, wherein initiating further comprises generating a first set of parameters;
    initiate a presentation of a navigation tool interface on the user computing device, wherein the navigation tool interface comprises all available navigation tools associated with an application;
    receive, via the navigation tool interface, a user input selecting one or more navigation tools from all the available navigation tools associated with the application for placement on the GUI, wherein the one or more navigation tools comprises a new navigation tool;
    classify the new navigation tool using the first set of parameters, wherein classifying further comprises predicting a placement of the new navigation tool in at least one of one or more GUI grids associated with the GUI; and
    populate the GUI with the one or more navigation tools, wherein populating further comprises executing the placement of the new navigation tool in the at least one of the one or more GUI grids associated with the GUI based on at least the classification.

2. The system of claim 1, wherein the at least one processing device is further configured to:
    receive information associated with the user, wherein the information associated with the user comprises at least a historical placement of one or more navigation tools on the GUI by the user on the user computing device; and
    receive information associated with the one or more peers, wherein the information associated with the one or more peers comprises at least a historical placement of the one or more navigation tools on the GUI by the one or more peers on the one or more peer computing devices.

3. The system of claim 1, wherein the at least one processing device is further configured to generate the information associated with the interaction of the user with the one or more GUI grids, wherein generating further comprises capturing one or more gestures executed by the user, wherein the one or more gestures comprises at least tap, press, two-finger tap, press-tap, press-and-hold, one-finger pan, two-finger pan, pinch, rotate, flick, drag-and-drop, slide to scroll, and slide-and-hold.

4. The system of claim 3, wherein the at least one processing device is further configured to generate the information associated with the interaction of the user with the one or more GUI grids, wherein generating further comprises capturing sequential interactions of the user with the one or more GUI grids.

5. The system of claim 1, wherein the at least one processing device is further configured to:
receive, via the user computing device, an access request from the user to access the application stored on the user computing device, wherein the application is associated with the GUI;
transmit, an authentication request to the user, wherein the authentication request comprises at least a request for one or more authentication credentials from the user;
receive the one or more authentication credentials from the user;
validate the user based on at least verifying the one or more authentication credentials; and
approve the access request to the GUI based on at least validating the user.

6. A computer program product for dynamic allocation of navigation tools based on learned user interaction, the computer program product comprising a non-transitory computer-readable medium comprising code causing a first apparatus to:
segment a graphical user interface (GUI) into one or more GUI grids, wherein the one or more GUI grids comprises one or more navigation tools positioned therein;
receive information associated with an interaction of a user with the one or more GUI grids associated with a graphical user interface (GUI) displayed on a user computing device, wherein receiving further comprises:
monitoring the interaction of the user with the one or more navigation tools for a predetermined period of time;
determining one or more sequences of GUI grid interactions performed by the user when interacting with the one or more navigation tools; and
capturing one or more gestures executed by the user on each GUI grid during each sequence of GUI grid interactions, wherein the one or more gestures comprises tap, press, two-finger tap, press-tap, press-and-hold, one-finger pan, two-finger pan, pinch, rotate, flick, drag-and-drop, slide to scroll, slide-and-hold, and shake;
receive information associated with the user, wherein the information associated with the user comprises a handedness of the user, an interaction technique of the user when interacting with the one or more GUI grids based on at least the handedness, and a favored side of the GUI based on at least the interaction technique;
receive information associated with one or more interactions of one or more peers with the one or more GUI grids associated with the GUI displayed on one or more peer computing devices, wherein the one or more peers are associated with a handedness that is same as the handedness of the user;
generate a training dataset based on at least the information associated with the interaction of the user with the one or more GUI grids, the information associated with the one or more interactions of the one or more peers with the one or more GUI grids, and the information associated with the user;
initiate one or more machine learning algorithms on the training dataset, wherein initiating further comprises generating a first set of parameters;
initiate a presentation of a navigation tool interface on the user computing device, wherein the navigation tool interface comprises all available navigation tools associated with an application;
receive, via the navigation tool interface, a user input selecting one or more navigation tools from all the available navigation tools associated with the application for placement on the GUI, wherein the one or more navigation tools comprises a new navigation tool;
classify the new navigation tool using the first set of parameters, wherein classifying further comprises predicting a placement of the new navigation tool in at least one of one or more GUI grids associated with the GUI; and
populate the GUI with the one or more navigation tools, wherein populating further comprises executing the placement of the new navigation tool in the at least one of the one or more GUI grids associated with the GUI based on at least the classification.

7. The computer program product of claim 6, wherein first apparatus is further configured to:
receive information associated with the user, wherein the information associated with the user comprises at least a historical placement of one or more navigation tools on the GUI by the user on the user computing device; and
receive information associated with the one or more peers, wherein the information associated with the one or more peers comprises at least a historical placement of the one or more navigation tools on the GUI by the one or more peers on the one or more peer computing devices.

8. The computer program product of claim 6, wherein the first apparatus is further configured to generate the information associated with the interaction of the user with the one or more GUI grids, wherein generating further comprises capturing one or more gestures executed by the user, wherein the one or more gestures comprises at least tap, press, two-finger tap, press-tap, press-and-hold, one-finger pan, two-finger pan, pinch, rotate, flick, drag-and-drop, slide to scroll, and slide-and-hold.

9. The computer program product of claim 8, wherein the first apparatus is further configured to generate the information associated with the interaction of the user with the one or more GUI grids, wherein generating further comprises capturing sequential interactions of the user with the one or more GUI grids.

10. The computer program product of claim 6, wherein the first apparatus is further configured to:
receive, via the user computing device, an access request from the user to access the application stored on the user computing device, wherein the application is associated with the GUI;
transmit, an authentication request to the user, wherein the authentication request comprises at least a request for one or more authentication credentials from the user;
receive the one or more authentication credentials from the user;
validate the user based on at least verifying the one or more authentication credentials; and
approve the access request to the GUI based on at least validating the user.

11. A method dynamic allocation of navigation tools based on learned user interaction, the method comprising:

segmenting a graphical user interface (GUI) into one or more GUI grids, wherein the one or more GUI grids comprises one or more navigation tools positioned therein;

receiving information associated with an interaction of a user with the one or more GUI grids associated with a graphical user interface (GUI) displayed on a user computing device, wherein receiving further comprises:

monitoring the interaction of the user with the one or more navigation tools for a predetermined period of time;

determining one or more sequences of GUI grid interactions performed by the user when interacting with the one or more navigation tools; and capturing one or more gestures executed by the user on each GUI grid during each sequence of GUI grid interactions, wherein the one or more gestures comprises tap, press, two-finger tap, press-tap, press-and-hold, one-finger pan, two-finger pan, pinch, rotate, flick, drag-and-drop, slide to scroll, slide-and-hold, and shake;

receiving information associated with the user, wherein the information associated with the user comprises a handedness of the user, an interaction technique of the user when interacting with the one or more GUI grids based on at least the handedness, and a favored side of the GUI based on at least the interaction technique;

receiving information associated with one or more interactions of one or more peers with the one or more GUI grids associated with the GUI displayed on one or more peer computing devices, wherein the one or more peers are associated with a handedness that is same as the handedness of the user;

generating a training dataset based on at least the information associated with the interaction of the user with the one or more GUI grids, the information associated with the one or more interactions of the one or more peers with the one or more GUI grids, and the information associated with the user;

initiating one or more machine learning algorithms on the training dataset, wherein initiating further comprises generating a first set of parameters;

initiating a presentation of a navigation tool interface on the user computing device, wherein the navigation tool interface comprises all available navigation tools associated with an application;

receiving, via the navigation tool interface, a user input selecting one or more navigation tools from all the available navigation tools associated with the application for placement on the GUI, wherein the one or more navigation tools comprises a new navigation tool;

classifying the new navigation tool using the first set of parameters, wherein classifying further comprises predicting a placement of the new navigation tool in at least one of one or more GUI grids associated with the GUI; and populating the GUI with the one or more navigation tools, wherein populating further comprises executing the placement of the new navigation tool in the at least one of the one or more GUI grids associated with the GUI based on at least the classification.

12. The method of claim 11, wherein the method further comprises:

receiving information associated with the user, wherein the information associated with the user comprises at least a historical placement of one or more navigation tools on the GUI by the user on the user computing device; and receiving information associated with the one or more peers, wherein the information associated with the one or more peers comprises at least a historical placement of the one or more navigation tools on the GUI by the one or more peers on the one or more peer computing devices.

13. The method of claim 11, wherein the method further comprises generating the information associated with the interaction of the user with the one or more GUI grids, wherein generating further comprises capturing one or more gestures executed by the user, wherein the one or more gestures comprises at least tap, press, two-finger tap, press-tap, press-and-hold, one-finger pan, two-finger pan, pinch, rotate, flick, drag-and-drop, slide to scroll, and slide-and-hold.

* * * * *